United States Patent
Gully et al.

(10) Patent No.: US 6,523,363 B1
(45) Date of Patent: Feb. 25, 2003

(54) EVAPORATOR WITH PLASTIC OUTER COVERING

(75) Inventors: Sylvain Gully, Rouen (FR); Bernard Valentin, St. Didier Mt d'Or (FR); Philippe Vaas, Mesnil Raoul (FR); Stephane Boudonnet, Le Thuit-Signol (FR)

(73) Assignee: Carrier Corporation, Syracuse, NY (US)

(*) Notice: Subject to any disclaimer, the term of this patent is extended or adjusted under 35 U.S.C. 154(b) by 0 days.

(21) Appl. No.: 10/003,549

(22) Filed: Oct. 24, 2001

(51) Int. Cl.$^7$ ................................................ F25D 21/14
(52) U.S. Cl. ........................................ 62/285; 62/291
(58) Field of Search ........................ 62/285, 426, 288, 62/291

(56) References Cited

U.S. PATENT DOCUMENTS

| | | | |
|---|---|---|---|
| 2,994,210 A | * 8/1961 | Millington | .................. 62/285 |
| 4,958,504 A | * 9/1990 | Ichikawa et al. | ............ 165/122 |
| 5,588,305 A | * 12/1996 | Sim | .............................. 62/419 |
| 6,105,383 A | * 8/2000 | Reimann et al. | .............. 62/244 |
| 6,196,015 B1 | * 3/2001 | Pignolo | ........................ 62/272 |

* cited by examiner

*Primary Examiner*—William E. Tapolcal
(74) *Attorney, Agent, or Firm*—Carlson, Gaskey & Olds

(57) ABSTRACT

An evaporator assembly includes a support housing for mounting to an internal compartment of a delivery truck or trailer. At least one evaporator coil mounts to the support housing along with at least one cooling fan. A plastic outer skin incorporates a drain pan to collect condensation and moisture dripping from the evaporator coils during the defrost cycle. The plastic outer covering includes thermal properties that eliminate the need for insulation required when using prior art aluminum coverings. End caps attached to each side of the outer covering include a drain tube. The plastic outer covering is formed in lengths from a plastic extrusion process and then cut to the required length for the evaporator assembly.

10 Claims, 3 Drawing Sheets

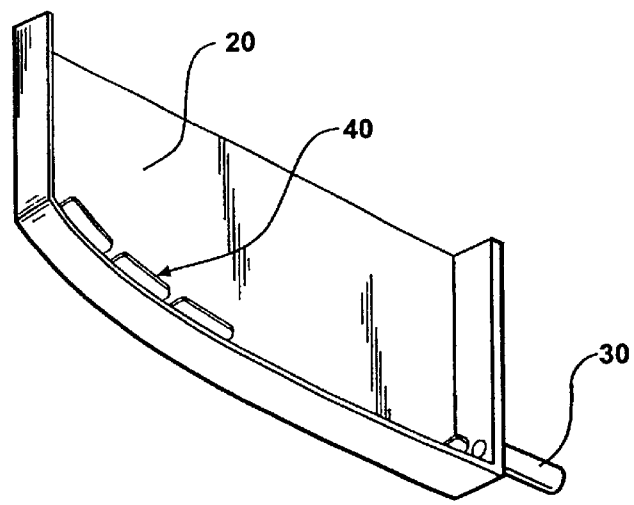
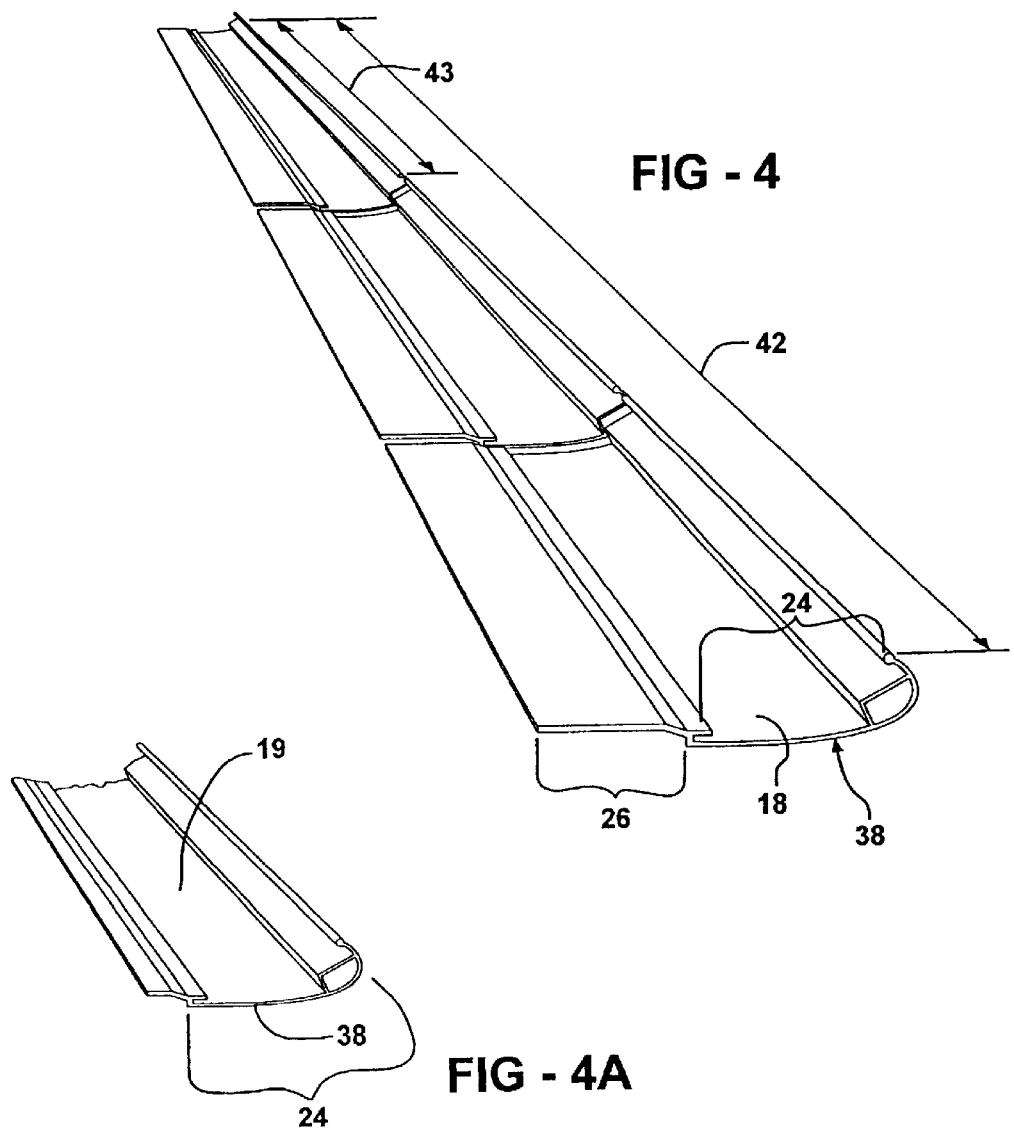

EVAPORATOR WITH PLASTIC OUTER COVERING

BACKGROUND OF THE INVENTION

This invention relates to a remotely located evaporator assembly for a truck refrigeration system and specifically to construction of an outer covering for the evaporator.

Delivery trucks and trailers transporting temperature sensitive cargo include specially designed climate control systems. Typically, truck climate control systems such as refrigeration systems include a motor and a compressor mounted outside of a cargo area. Refrigerant flows from the compressor into the cargo area to at least one remotely located evaporator unit. The refrigerant flows through an evaporator coil in the evaporator and back to the compressor. Cooling fans mounted within the evaporator blow air across the evaporator coils such that the air is cooled and expelled into the cargo area.

The evaporators mounted within the cargo area are typically composed of a support housing mounted to an interior surface of the cargo area. The evaporator coils and the cooling fans are mounted to the support housing. Refrigerant lines extend into the cargo area from the compressor to provide refrigerant to the evaporators. An outer skin conceals and protects the cooling fans and the evaporator coils. Typically, the outer skin is constructed of aluminum and is secured to the support housing by fasteners. The evaporator includes a drain pan and drain hose to collect and expel condensation that drips from the evaporator coils during normal operation or during a defrost cycle. Insulation is disposed along the inside of the aluminum outer covering to prevent a build up of condensation on the exterior surfaces of the evaporator that may than drip into the cargo area.

The size and shape of the evaporator is dependent on the type of application and the configuration of the delivery truck or trailer. The evaporator may also be constructed as a single or dual discharge. A single discharge evaporator blows air into the compartment from one side, whereas a dual discharge blows cooling air from two sides and includes two evaporator coils. Different sizes and shapes of evaporators require different outer coverings and therefore require fabrication of specific outer coverings for each size and shape of evaporator. Further, the use of aluminum for fabrication of the outer coverings affects the entire design of the evaporator by requiring the use of specific fasteners and support housing configurations, to compensate for the build up of condensation along the outside of the evaporator unit. Further, the plastic outer covering is lighter than an aluminum skin such that the entire evaporator assembly can be fabricated from lighter materials.

For these reasons it is desirable to design an outer covering for remotely mounted evaporators that includes common components, and incorporates separate components to simplify assembly, and reduce the weight.

SUMMARY OF THE INVENTION

An embodiment of this invention is an evaporator assembly including a plastic outer covering including integrally formed features to reduce the total number of parts in each evaporator assembly.

The evaporator assembly includes a support housing for mounting to an internal compartment of a delivery truck or trailer. At least one evaporator coil mounts to the support housing along with at least one cooling fan. The evaporator assembly includes a plastic outer skin that incorporates a drain pan to collect condensation and moisture dripping from the evaporator coils during the defrost cycle. The plastic outer covering includes thermal properties that eliminate the need for separate insulation required when using prior art aluminum coverings.

The plastic outer covering is formed with a profile that includes a drain pan section and a planer section. The drain pan section is positioned under the evaporator coils and the planer section is positioned under the cooling fans of the evaporator. The profile includes a hinge that cooperates with the support housing to secure the outer covering at the drain pan section. Fasteners are used to secure the planer section to the support housing. The hinge and fastener configuration allows the outer covering to be swung downward from the evaporator for maintenance and repair without being completely removed.

The plastic outer covering is formed by a plastic extrusion process known as poltrusion. A common tool including the profile of the drain pan and the planer section is used to form long sections that are then cut into the required lengths for each size of evaporator. End caps are attached by an industrial adhesive to the outer covering to form the sides of the drain pan section. One of the end caps includes an integrally formed drain tube to provide for draining of the drain pan.

The profile formed from the poltrusion process is configured for use with a single discharge evaporator as one piece. Dual discharge assemblies require two drain pan sections because of the additional evaporator coil. The additional drain pan section is formed with a common tool by blocking the planer section and forming a length of drain pane sections that is cut to the required lengths.

The plastic outer covering reduces the overall weight of the evaporator unit by replacing multiple features with a single part, and because of the reduced weight of the plastic outer covering and the integral hinge features, a lighter support housing can be used.

The plastic outer covering of this invention simplifies assembly by providing a common profile easily cut into required lengths and by eliminating multiple parts while reducing overall evaporator assembly weight.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a perspective view of an end cap;

FIG. 4 is a perspective view of a section of poltruded outer covering; and

FIG. 4a is a perspective view of a section of poltruded outer covering with only the drain pan section.

DETAILED DESCRIPTION OF THE PREFERRED EMBODIMENT

Figure 1:
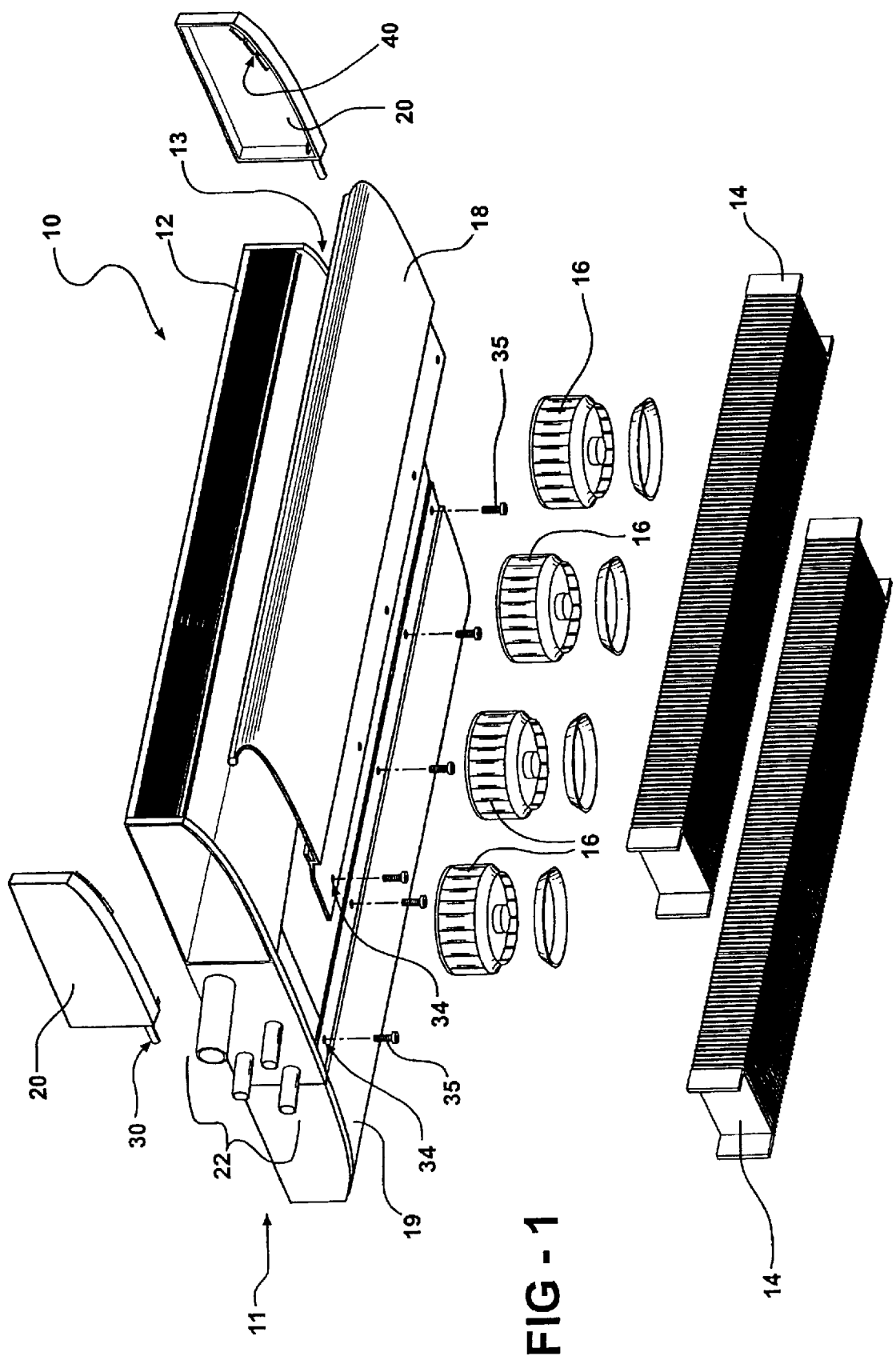
FIG. 1 is an exploded view of an evaporator assembly.

Referring to the Figures, wherein like numerals indicate like or corresponding parts throughout the several views, an embodiment of an evaporator is generally shown at 10 in FIG. 1. The evaporator 10 includes a support housing 12 mounted within climate-controlled space. The support housing 12 includes first and second sides 11,13 that include inlet and outlet tubing 22 from a compressor unit (not shown). The inlet and outlet tubing 22 communicate fluid with evaporator coils 14 (FIG. 2) attached to the support housing 12. The evaporator assembly 10 shown in FIG. 1 is a dual discharge evaporator and would include two evaporator coils 14. A single discharge evaporator assembly would include only one evaporator coil 14 and is within the scope and contemplation of this invention. Electric fans 16 are positioned within the support housing 12 to circulate air through the evaporator assembly 10 and through the evaporator coils 14 and out the grating 44. The fans 16 may be of any type known in the art, however preferably the electric fans 16 are driven by an alternating current.

An outer covering 18 attaches to the support housing 12 by way of a hinge 28 on one end and by threaded fasteners 3 5 secured through openings 34. The outer covering 18 is fabricated from a plastic material in a poltrusion process. The poltrusion process is an extruding process specifically for fabricating plastic. Attached to sides of the outer covering 18 are end caps 20. At least one of the end caps 20 includes a drain tube 30 for attachment to a drain hose (not shown).

Figure 2:
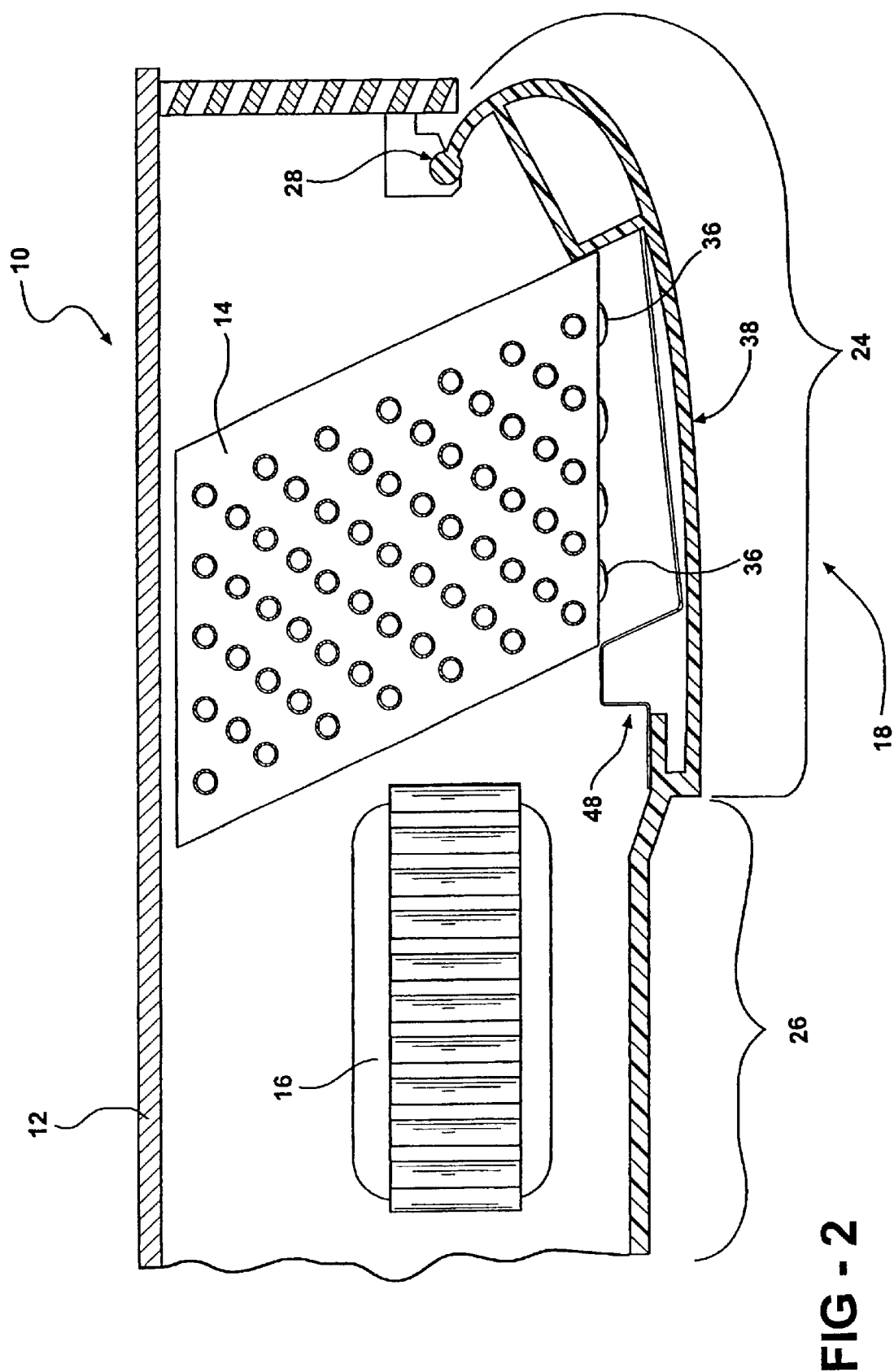
FIG. 2 is a cross-sectional view an evaporator assembly.

Referring to FIG. 2, the evaporator assembly 10 is shown in cross-section with the evaporator 14 and the fan 16 schematically illustrated. As appreciated, the fan 16, and the evaporator would include support brackets and fasteners that are known to one skilled in the art and are not a necessary part of this invention. The outer covering is fabricated from a plastic extrusion process to form a specifically shaped profile 38. The profile 38 includes a drain pan section 24 and a panel section 26. In prior art outer coverings fabricated from aluminum sheet, a separate drain pan is installed to collect moisture dripping from the evaporator coils 14. A layer of insulation is required between the drain pan and the aluminum covered to prevent the build up of condensation on the outside of the aluminum covering. The plastic outer covering 18 of the subject application includes the integral drain pan 24 that is only possible due to the favorable thermal conductive properties of the plastic materials that eliminate the formations of condensation. In other words, the use of the plastic material for the outer covering 18 provides for the use of the integral drain pan 24 because of favorable thermal properties inherent in the plastic material.

Referring also to FIG. 3, two end caps 20 are attached to each side of the outer covering to form the sides of the drain pan 24 and include a drain tube 30 for connection to a drain hose (not shown) to direct water out of the drain pan 24. The end caps 20 are preferably fabricated from a plastic material and include tabs 40. The tabs 40 form a channel into which the profile 38 of the outer covering 18 fits. The end caps 20 are preferably attached to the outer covering 18 by an industrial adhesive as is known by to those skilled in the art.

Evaporator assemblies 10 are fabricated in various lengths and therefore require varying lengths of outer coverings 18. Prior art outer covering fabricated from aluminum required that each length of evaporator have specifically designed and fabricated outer skins. Referring to FIG. 4, the current invention forms the outer covering from a poltrusion process that produces a total length 42 of outer skin profile 38. The same outer skin profile 38 is used for each length of evaporator 10 and therefore is simply fabricated by cutting the total length 42 into sections 43 for each specific outer covering 18.

In addition to the various lengths of outer covering using the same profile to eliminate the need of fabricating differing lengths of outer covering, the same profile is used for the single and duel discharge evaporators. The poltrusion process includes a die that forms the profile as plastic material is pushed through. Blocking off a portion of the die allows for the fabrication of only specific sections of the profile, such as the drain pan section (FIG. 4A).

Referring back to FIG. 1, for dual evaporator assemblies 10, lengths of the outer skin are fabricated that include only the drain pan section 24. The dual discharge evaporator 10 is then formed by assembling the two outer skins 18, 19 to the support housing 12. The first outer 18 skin includes both the drain pan 24 and the panel section 26, and the second outer skin 19 includes only the drain pan section 24. The two panels 18, and 19 are separate panels that are independently attached to the support housing 12.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An evaporator assembly comprising:
   an evaporator coil attached to a support housing;
   a fan attached to said support housing; and
   a plastic outer covering attached to said support housing, said outer covering forming a drain pan portion and being removable from said support housing independent of said evaporator coil and said fan.

2. The assembly of claim 1, wherein said plastic outer covering is formed from a poltrusion process.

3. The assembly of claim 1, wherein in said outer covering includes first and second end caps forming sides of said drain pan portion.

4. The assembly of claim 3, wherein one of said end caps includes a drain tube positioned to drain moisture from said integrally formed drain pan.

5. The assembly of claim 1, wherein said outer covering includes a hinge that interlocks into said support housing.

6. The assembly of claim 1, wherein said end caps are attached to said outer covering by way of an adhesive.

7. The assembly of claim 1, wherein said outer covering includes a middle section and a drain pan section.

8. The assembly of claim 1, wherein said fan is driven by an alternating current electric motor.

9. The assembly of claim 1, including a hinge portion formed by said plastic outer covering providing for rotation of said plastic outer covering away from said evaporator.

10. The assembly of claim 9, wherein said hinge portion comprises a cylindrical portion formed by said plastic cover and interlocking within said support housing.

* * * * *